US007301855B2

(12) United States Patent
Aoyama et al.

(10) Patent No.: US 7,301,855 B2
(45) Date of Patent: Nov. 27, 2007

(54) APPARATUS AND METHOD FOR STORING ROM AND RAM DATA INTO MAGNETO-OPTICAL RECORDING MEDIUM

(75) Inventors: Nobuhide Aoyama, Kawasaki (JP); Yasuaki Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 605 days.

(21) Appl. No.: 10/959,715

(22) Filed: Oct. 6, 2004

(65) Prior Publication Data

US 2005/0041538 A1 Feb. 24, 2005

Related U.S. Application Data

(63) Continuation of application No. PCT/JP02/03712, filed on Apr. 15, 2002.

(51) Int. Cl.
*G11B 11/00* (2006.01)
(52) U.S. Cl. ............................... 369/13.11; 369/30.23
(58) Field of Classification Search ............... None
See application file for complete search history.

(56) References Cited

U.S. PATENT DOCUMENTS

| 5,436,875 | A | 7/1995 | Shinada |
| 5,566,144 | A | 10/1996 | Shinada |
| 5,715,232 | A | 2/1998 | Chikazawa et al. |
| 5,740,153 | A | 4/1998 | Ohta et al. |
| 5,812,519 | A | 9/1998 | Kawamura et al. |
| 5,907,525 | A | 5/1999 | Ohta et al. |
| 7,154,824 | B2 * | 12/2006 | Aoyama et al. ............ 369/47.5 |
| 2005/0018848 | A1 * | 1/2005 | Aoyama et al. ............ 380/255 |
| 2005/0058028 | A1 * | 3/2005 | Aoyama et al. ......... 369/13.35 |
| 2005/0128888 | A1 * | 6/2005 | Hosokawa et al. ...... 369/13.54 |
| 2005/0141402 | A1 * | 6/2005 | Hosokawa ............... 369/275.3 |
| 2005/0207324 | A1 * | 9/2005 | Hosokawa et al. ...... 369/275.3 |
| 2006/0092787 | A1 * | 5/2006 | Hosokawa et al. ...... 369/275.1 |

FOREIGN PATENT DOCUMENTS

JP 02-091841 3/1990

(Continued)

OTHER PUBLICATIONS

Chikazawa et al.; "One Method of Realization Relating to a Concurrent ROM-RAM Optical Disk"; Journal of the Institute of Television Engineers of Japan; Vo. 46, No. 10, pp. 1319-1324; 1992.

*Primary Examiner*—Tan Dinh
(74) *Attorney, Agent, or Firm*—Greer, Burns & Crain, Ltd.

(57) ABSTRACT

An optical disk apparatus records new information related to the ROM information into RAM at a position linked with the ROM information of an optical information storage medium while continuously regenerating the ROM information of the optical information storage medium. At least the ROM signals are read at n (n>2) times of the information regeneration velocity V, which is a reference, and stored in a buffer memory for reading, then the stored information is output at a velocity of the information regeneration velocity V. And while the stored information is being output from the buffer memory for reading, the input information is stored in the buffer memory for writing, then the optical head is accessed an address position that is managed so that the time relationship of the output information and the input information link for recording.

14 Claims, 19 Drawing Sheets

FOREIGN PATENT DOCUMENTS

| | | |
|---|---|---|
| JP | 2-244445 | 9/1990 |
| JP | 6-195866 | 7/1994 |
| JP | 6-202820 | 7/1994 |
| JP | 7-014231 | 1/1995 |
| JP | 7-065375 | 3/1995 |
| JP | 7-078412 | 3/1995 |
| JP | 08-195022 | 7/1996 |
| JP | 2000-306333 | 11/2000 |

* cited by examiner

FIG. 10

| FOCUSING ERROR SIGNAL FES | $\dfrac{(A+C)-(B+D)}{A+B+C+D}$ |
|---|---|
| TRACKING ERROR SIGNAL TES | $\dfrac{E-F}{E+F}$ |
| MO SIGNAL (RAM) | $G-H$ |
| LD POWER FEEDBACK SIGNAL (ROM1), (ROM2) | $G+H$ , $I$ |

FIG. 11

|  | LD FEED BACK SIGNAL | ROM SIGNAL | RAM SIGNAL |
|---|---|---|---|
| ROM & RAM REPRODUCE SIMULTANEOUSLY | G+H | I | G−H |
| RAM RECORDING (MAGNETIC FIELD MODULATION RECORDING) | I | G+H | − |
| RAM RECORDING (LIGHT MODULATION RECORDING) | I | − | − |

FIG. 13

| CLUSTER POSITION (FOR EXTERNAL OUTPUT) | | | n | | n+1 | | n+2 | | n+3 | |
|---|---|---|---|---|---|---|---|---|---|---|
| CLUSTER POSITION (FOR EXTERNAL INPUT) | | | n | | n+1 | | n+2 | | n+3 | |
| CLUSTER POSITION (FOR OPTICAL PICK UP) | n | n+1 | | n+2 | | n+3 | | n+2 | | n+4 |
| STATUS OF OPTICAL PICK UP | READ ACCESS | READ ACCESS | WRITE ACCESS | READ ACCESS | WRITE ACCESS | READ ACCESS | WRITE ACCESS | READ ACCESS | WRITE ACCESS | READ ACCESS |
| ROM REPRODUCTION BUFFER | BUFFER 1 | | | | | | | | | |
| | BUFFER 2 | | | | | | | | | |
| RAM REPRODUCTION BUFFER | BUFFER 3 | | | | | | | | | |
| | BUFFER 4 | | | | | | | | | |
| RAM RECORDING BUFFER | BUFFER 5 | | | | | | | | | |
| | BUFFER 6 | | | | | | | | | |

US 7,301,855 B2

APPARATUS AND METHOD FOR STORING ROM AND RAM DATA INTO MAGNETO-OPTICAL RECORDING MEDIUM

CROSS-REFERENCE TO RELATED APPLICATIONS

This application is a continuation of international application PCT/JP02/03712, filed on Apr. 15, 2002.

TECHNICAL FIELD

The present invention relates to an optical storage apparatus for optically recording and regenerating data to/from an optical recording medium by an optical head and read/write method for an optical storage medium, and more particularly to an optical storage apparatus for recording while regenerating data using an optical recording medium that has both functions of ROM (Read Only Memory) and RAM (Random Access Memory), and read/write method for the optical storage medium.

BACKGROUND ART

The advancement of technology in the information recording field is remarkable, and research and development are energetically ongoing for high density recording and regeneration and high-speed access of optical memories using lights and magneto-optical disk memories, for example. Research and development for utilizing the features of such optical disk memories are advancing, and in Japanese Patent Application Laid-Open No. H6-202820 or in the Journal of the Institute of Television Engineers of Japan, Vol. 46, No. 10, pp. 1319-1324 (1992), for example, a concurrent ROM-RAM optical disk which allows the simultaneous regeneration of ROM (Read Only Memory)—RAM (Random Access Memory) is disclosed.

Such an optical information recording medium which allows simultaneous regeneration of ROM-RAM has a characteristic whereby ROM-RAM simultaneous regeneration, which is impossible with a magnetic disk, is possible, in addition to a characteristic whereby storage capacity double a normal optical disk memory can be obtained.

For example, according to the prior art, on the optically transparent substrate where phase pits are formed in a spiral or concentric manner, an optical information recording medium on which magneto-optical recording film is formed is used. And light is condensed almost to the diffraction limit from the optical pickup, is irradiated onto the optical information recording medium, light returned from this optical information recording medium is modulated by the phase pits and light intensity thereof is regenerated as a ROM signal. And the differential amplitude in the polarization direction when the return light is modulated by the magneto-optical recording film is regenerated as a RAM signal.

And a magnetic head, for applying the magnetic field on the optical information recording medium, is installed on the optical pickup, and the RAM signals are recorded on the magneto-optical recording film by changing at least one of condensed light from the optical pickup and the magnetic field.

In this prior art, it is theoretically possible to regenerate ROM and RAM simultaneously by one optical pickup and record the data in the RAM while regenerating the data in the ROM. However various aspects require improvement to actually utilize these superb functions.

For example, it is desirable to record user data to be sequentially input in the RAM for a medium where such stream information as music and image information is recorded as ROM information while regenerating only ROM information or both ROM and RAM information of the medium. In other words, while regenerating music and images (e.g. scenery, maps) recorded as ROM information, such as a CD (Compact Disk) without interruption, a singing voice and commentary are recorded in RAM, or while regenerating music and images (e.g. scenery, maps) recorded as ROM information and RAM information without interruption, the playing sound of an instrument, new map and road information are recorded in RAM.

In such a case, with the prior art alone, recording in RAM while regenerating ROM is possible, but it is difficult to record RAM information in a predetermined relationship where regenerated ROM information and recorded RAM information are linked.

Also in the prior art, simultaneous regeneration of ROM and RAM is possible, but the data cannot be recorded in the RAM during this simultaneous regeneration. For the user, it is desirable that information can be input and recorded in the optical information recording medium without interruption while regenerating ROM information or already recorded RAM information.

DISCLOSURE OF THE INVENTION

With the foregoing in view, it is an object of the present invention to provide an optical storage apparatus for recording new information related ROM information to a RAM at a position linked with the ROM information of the optical storage medium while continuously regenerating the ROM information of the optical storage medium, and a read/write method for the optical storage medium.

It is another object of the present invention to provide an optical storage apparatus for recording new information to the RAM of the optical storage medium while continuously regenerating the ROM information and the RAM information of the optical storage medium, and a read/write method of the optical storage medium.

It is still another object of the present invention to provide an optical storage apparatus for recording new stream information to the RAM of the optical storage medium, while continuously regenerating the stream information of the optical storage medium, and a read/write method of the optical storage medium.

To solve the above problems, the optical storage apparatus of the present invention has an optical head for irradiating light onto an optical information recording medium where a magneto-optical recording film is formed on a substrate on which phase pits are formed, detecting the light intensity of light modulated by the phase pits from return light from the optical information recording medium as ROM signals, and detecting the differential amplitude of the components in the polarization direction when the return light is modulated by the magneto-optical recording film as RAM signals; a magnetic field application unit for applying a magnetic field to the information recording medium for recording the information to the magneto-optical recording film; and a track actuator for accessing at least the optical head at a desired position of the optical information recording medium. The storage apparatus further comprises a buffer memory for reading to store at least the detected ROM signals, a buffer memory for writing to store the input signals to be written to the magneto-optical recording film, and a controller for reading at least the ROM signals at n (n>2) times of information regeneration velocity V, which is a reference, storing the ROM signals in the buffer memory for reading, then outputting the stored information at the velocity of the information regeneration velocity V. The controller stores the input information to the buffer memory for writing, then accesses the optical head at an address position that is managed so that the time relationship of the output information and the input information link and records the information from the buffer memory for writing at n times velocity as RAM signals, while the stored information is being output from the buffer memory for reading.

In the present invention, preferably the buffer memory for reading further has a buffer memory for reading ROM signals that stores the ROM signals, and a buffer memory for reading RAM signals that stores the RAM signals, and further has a computing unit for computing information from both of the buffer memories for reading.

In the present invention, preferably at least one of the buffer memory for reading ROM signals and the buffer memory for writing RAM signals has two internal buffer memories and a switch, and the controller switches the switch when the storage volume of one internal buffer memory reaches a reference volume, and stores the information to the other internal buffer memory.

In the present invention, preferably the magnetic field application unit has a magnetic head that moves along with the optical head, and applies a modulated magnetic field at a position where the optical head condenses light, so as to execute overwrite recording.

In the present invention, preferably the information is read and the information is recorded at n>4.

In the present invention, preferably the controller modulates the irradiation power of the optical head to execute overwrite recording.

In the present invention, preferably the controller controls the read and write of the magneto-optical recording film using a RAM format of the magneto-optical recording film that is the same as the ROM format by the phase pits of the optical information recording medium.

In the present invention, the ROM signals and the RAM signals are simultaneously read at high-speed, and this read information is stored in the buffer memory, and the information is regenerated from the buffer memory at a reference velocity. And the ROM information and the input information from the user are stored in the buffer memory, and is recorded as RAM signals at high-speed.

More specifically, the ROM signals and the RAM signals are read at n times of velocity where n is a positive number of 2 or greater, and the RAM signals are recorded at n times of velocity. Before reading the ROM and RAM signals and recording the RAM signals, the optical pickup must access a desired position, and if n>4, the above problem can be solved without increasing the buffer memory.

In the present invention, RAM signals are directly recorded without an erasing operation by the magnetic field modulation method while irradiating a predetermined average power of light, therefore smooth recording and regeneration of information can be implemented. Also the magneto-optical recording film of the RAM for optical modulation overwriting is used, therefore information recording is possible even on a disk where a label with bumps are formed on the top face of the optical disk medium.

BRIEF DESCRIPTION OF THE DRAWINGS

FIG. 10 is a table showing the relationship of the output of the optical detector in FIG. 9, focus error (FES) detection, track error (TES) detection, and MO signal and LD feedback signal based on that output;

FIG. 11 is a table showing a combination of ROM and RAM detection in each regeneration and recording mode in the main controller in FIG. 6 and FIG. 8;

FIG. 13 is a time chart of the read/write operation in FIG. 12;

PREFERRED EMBODIMENTS OF THE INVENTION

Embodiments of the present invention will now be described in the sequence of ROM-RAM optical disk, optical disk drive, read/write control mechanism and other embodiments.

ROM-RAM Optical Disk

Figure 1:
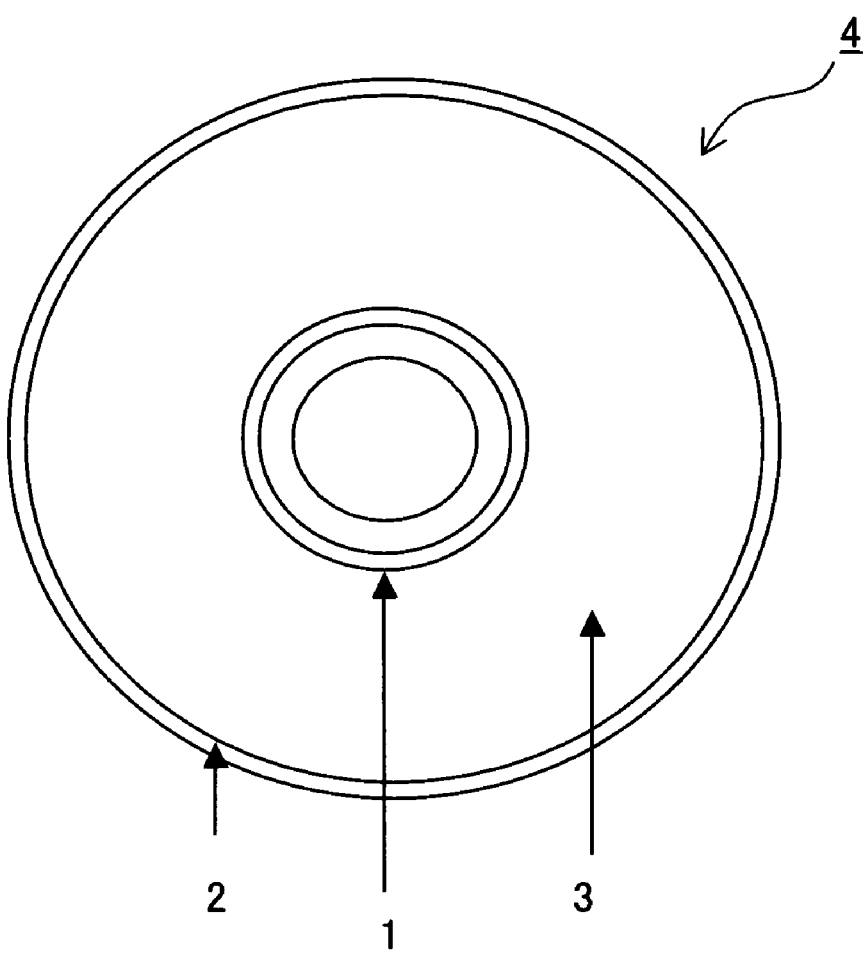
FIG. 1 is a plan view depicting a magneto-optical disk as an example of an optical information recording medium to be used as an embodiment of the present invention.
Figure 2:
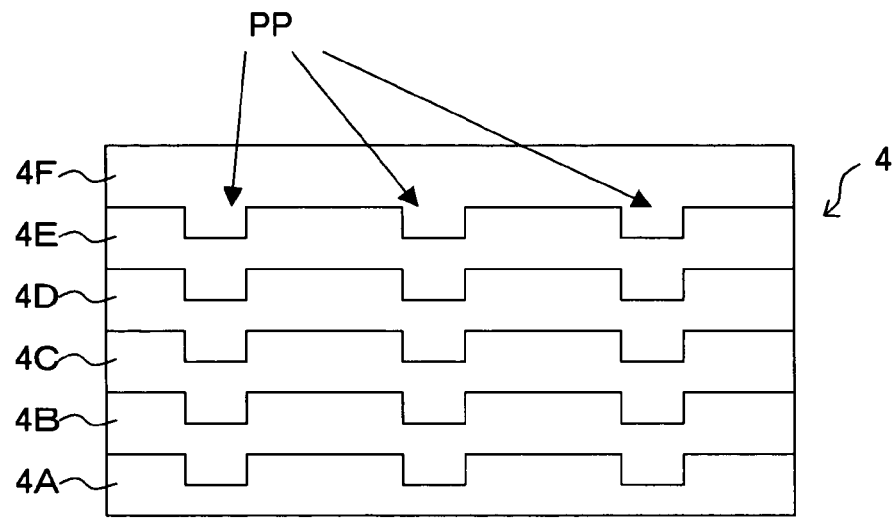
FIG. 2 is a cross-sectional view depicting the configuration of the ROM-RAM magneto-optical disk memory shown in FIG. 1.
Figure 3:
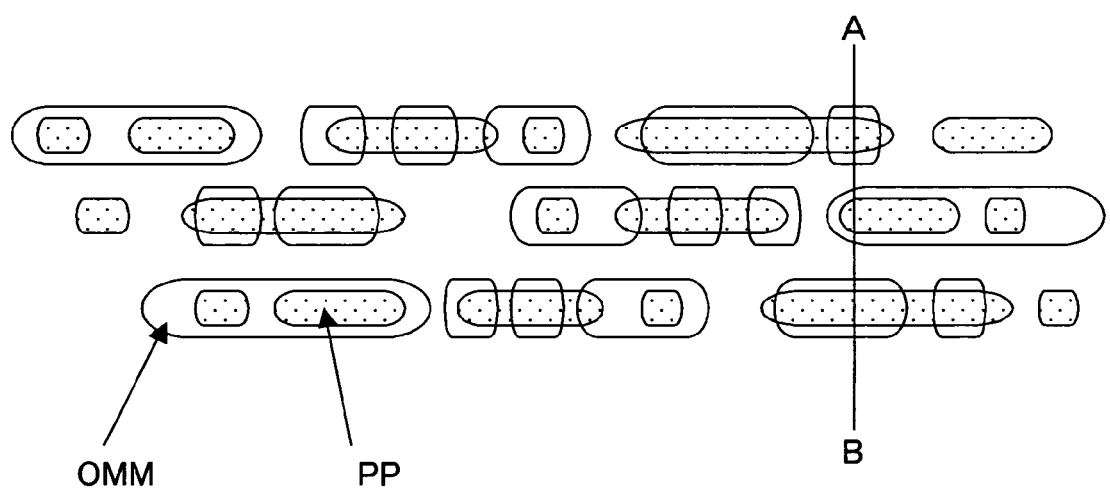
FIG. 3 is a plan view depicting the recording status of the ROM information and the RAM information in the optical information recording medium of the structure shown in FIG. 2.
Figure 4:
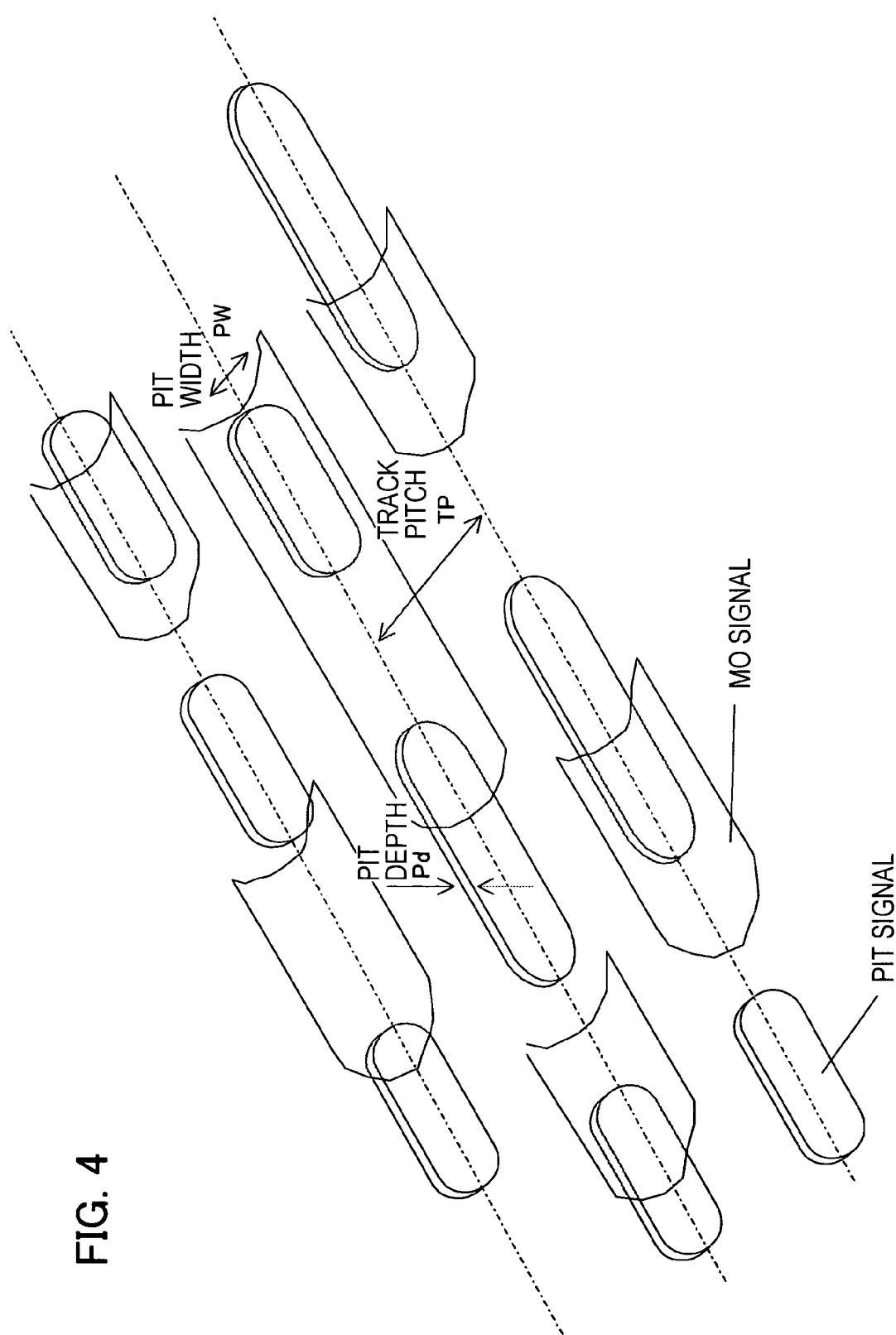
FIG. 4 is a perspective view depicting the recording status of the ROM information and the RAM information in the optical information recording medium of the structure shown in FIG. 2.
Figure 5:
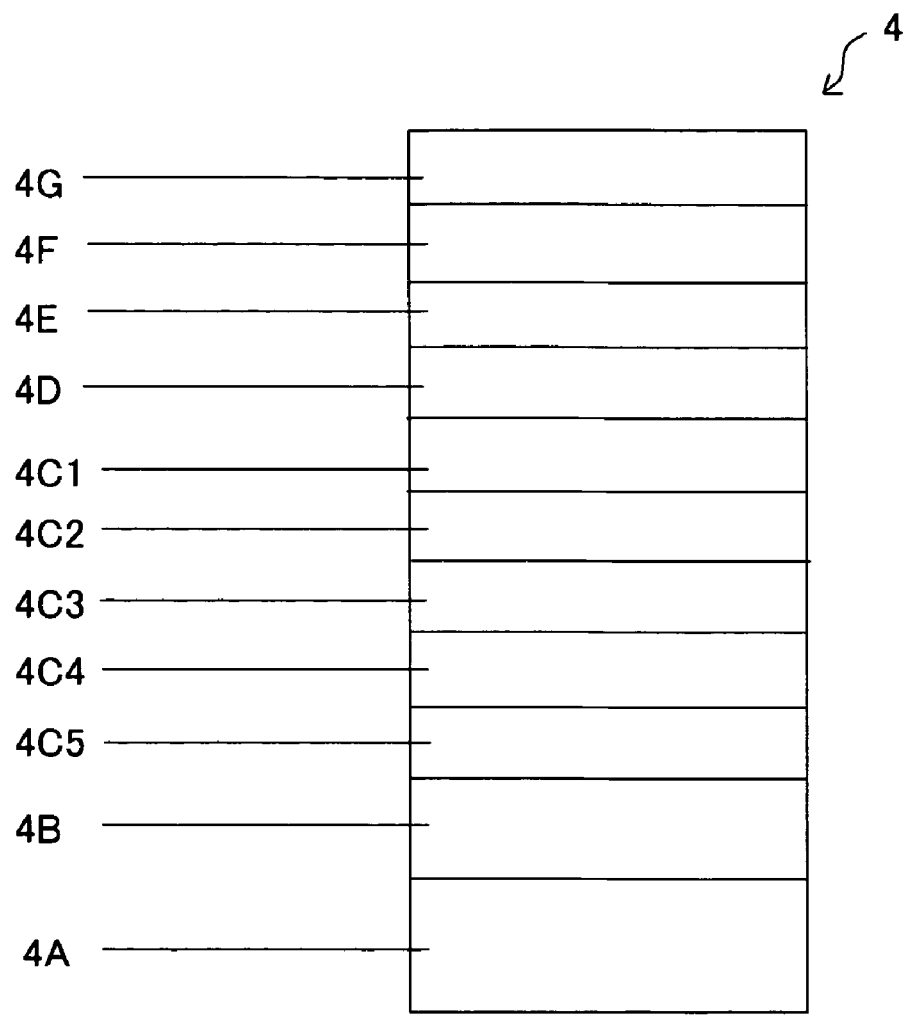
FIG. 5 is a cross-sectional view depicting the optical information recording medium according to another embodiment of the present invention.

FIG. 1 is a plan view of the ROM-RAM optical recording medium according to an embodiment of the present invention, and FIG. 2 is a cross-sectional view thereof, FIG. 3 is a front view of the user area thereof, FIG. 4 is a diagram depicting the relationship of the ROM signals and RAM signals thereof, and FIG. 5 is a cross-sectional view of the ROM-RAM optical recording medium according to another embodiment of the present invention.

In the description on FIG. 1 and later, the ROM-RAM magneto-optical disk (MO) will be described as an example of the ROM-RAM optical recording medium. As FIG. 1 shows, the ISO standard magneto-optical disk 4 has a disk shape, where the lead-in area 1 is formed in the innermost track, the lead-out area 2 is formed in the outermost track, and the user area 3 is formed between them.

The lead-in area 1 and lead-out area 2 are areas used for ROM information comprised of phase pits formed by bumps on the disk on the polycarbonate substrate, where such information as disk specifications are recorded. By reading this, the conditions of recording/regeneration are controlled. The optical depth (pit depth) of the phase pits to be this ROM information is set so that the light intensity modulation during regeneration becomes the maximum. Generally the modulation factor (ratio of change of light intensity of the phase pit section with respect to the light intensity of the flat section) is set to 70% or more.

Between the lead-in area 1 and lead-out area 2, a user area 3, where the magneto-optical recording film is formed on the sputtering device, is disposed. In this user area 3, the user can record/regenerate information freely.

In order to provide the functions of ROM and RAM to this user area 3, the magneto-optical disk 4 is normally comprised of a first dielectric layer 4B made of silicon nitride or tantalum oxide, for example, a magneto-optical recording layer 4C made of an amorphous alloy of a rare earth metal and transition metal, such as TbFeCo, a second dielectric layer 4D made of the same material as the first dielectric layer 4B, a reflection layer 4E made of such metals as AlTi and Au, and a protective coat layer 4F made of an ultraviolet hardening resin, layered on the polycarbonate substrate 4A.

As FIG. 2 and FIG. 3 show, ROM functions are provided by the phase pits PP formed as bumps on the disk 4, and the RAM functions are provided by the magneto-optical recording layer 4C. To record magneto-optical signals OMM on the magneto-optical recording layer 4C, the magneto-optical recording layer 4C is heated by a laser beam to assist magnetization inversion, then the direction of magnetization is inverted according to the signal magnetic field. This makes it possible to record the RAM information.

To read the recorded information on the magneto-optical recording layer 4C, a weak laser beam is emitted onto the recording layer 4C, then the polarization surface of the layer beam changes according to the direction of the magnetization of the recording layer 4C by a polarization Kerr effect, and the presence of signals is judged by the level of the polarization component of the reflected light at this time. By this, the RAM information can be read. In this reading, the reflected light is modulated by the phase pits PP constituting the ROM, so the ROM information can be read simultaneously.

In the optical information recording medium with such a structure, the ROM information is fixed and recorded by the phase pits PP created by bumps formed on the flat substrate, and the RAM information is recorded as MO signals OMM on the rows of the phase pits PP on the magneto-optical recording layer, as shown in FIG. 3 and FIG. 4. FIG. 2 is a cross-section along the A-B line in the radius direction in FIG. 3.

In other words, ROM and RAM can be simultaneously regenerated by one optical pickup, and if a magnetic field modulation type magneto-optical recording is used, writing to RAM and the regeneration of ROM can be simultaneously executed.

FIG. 5 is a cross-sectional view of another magneto-optical disk suitable for optical modulation recording. Compared with the cross-sectional configuration of the magneto-optical disk in FIG. 2, the label layer 4G is formed on the top surface, and the magneto-optical recording layer 4 is comprised of the initialization layer 4C1, switch layer 4C2, recording layer 4C3, intermediate layer 4C4 and regeneration layer 4C5.

In the embodiment in FIG. 2, the RAM information is recorded by a direct overwrite according to the magnetic modulation recording method. In the embodiment in FIG. 5, on the other hand, the RAM information is recorded by the optical modulation recording method. In the optical information recording medium for commercial usage, a label 4G is often printed to display the product title and information related to content, as shown in FIG. 5. On such a label 4G, several tens of $\mu$m of bumps are generally formed, and spacing with the magnetic head is a problem in the case of magnetic field modulation recording. Therefore the information is recorded using the medium for the optical modulation overwrite shown in FIG. 5.

Optical Disk Drive

Figure 6:
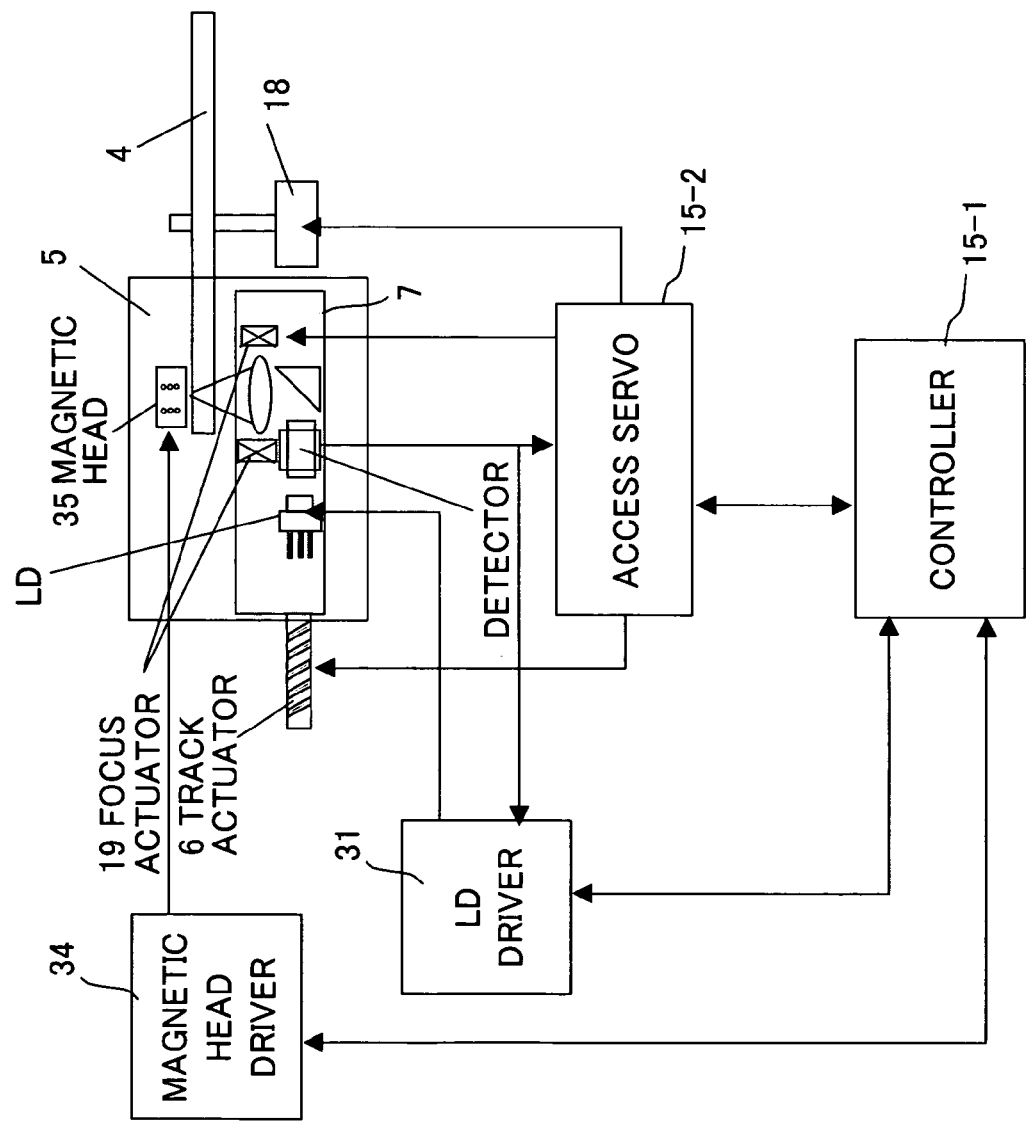
FIG. 6 is a block diagram depicting a general configuration of an embodiment of the optical storage apparatus of the present invention.
Figure 7:
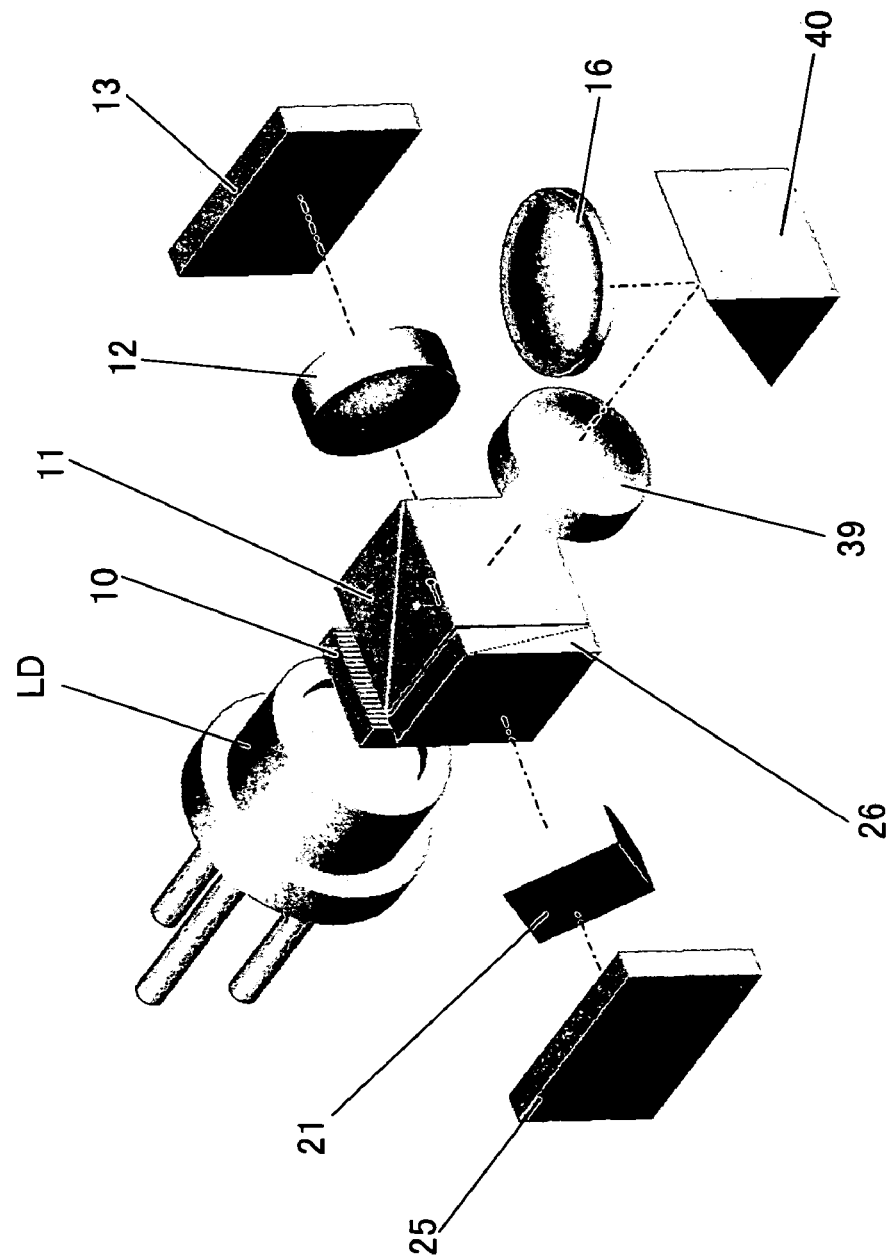
FIG. 7 is a diagram depicting details of the optical system of the optical pickup in FIG. 6.
Figure 8:
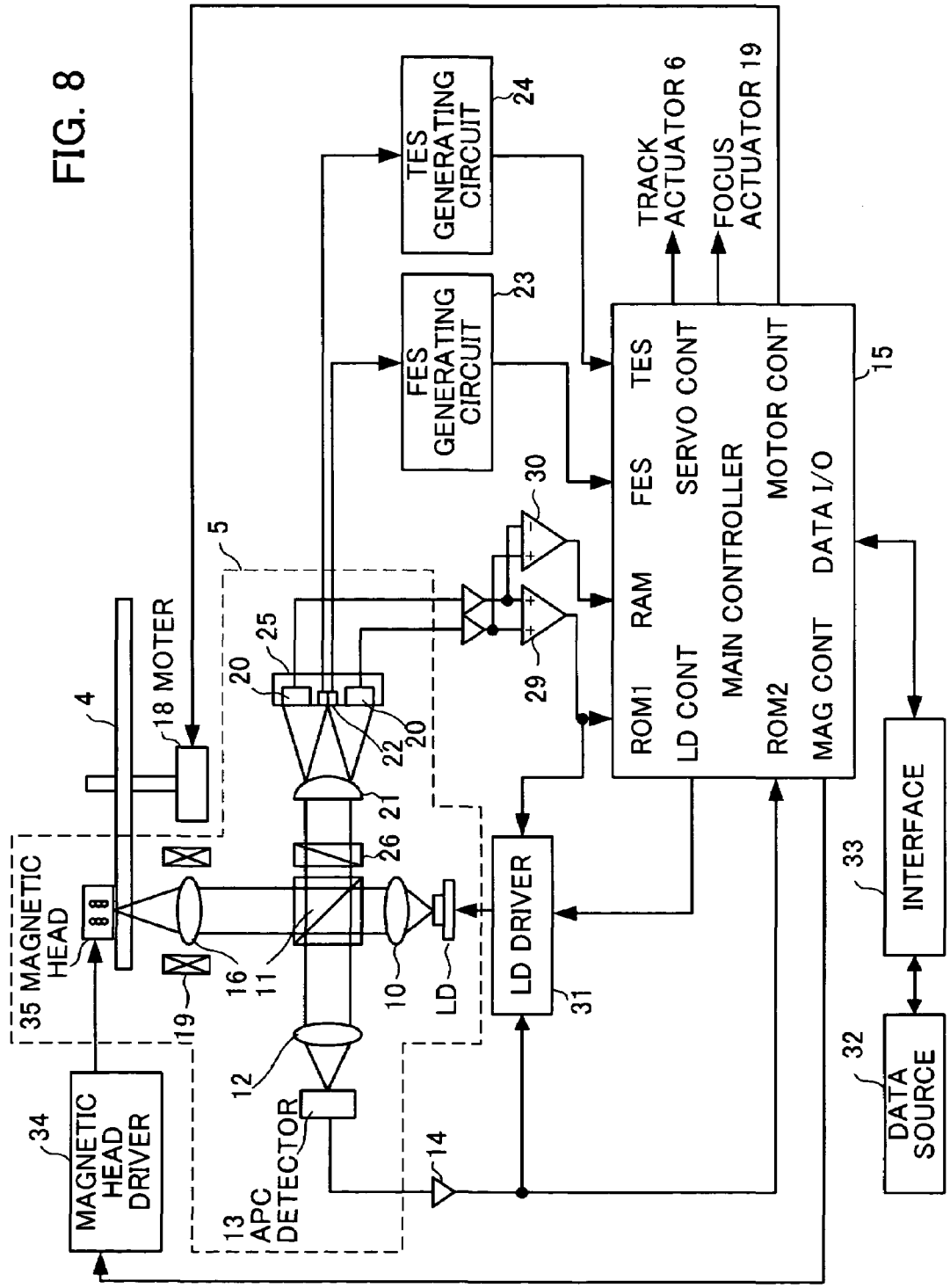
FIG. 8 is a block diagram depicting details of a part of FIG. 6.
Figure 9:
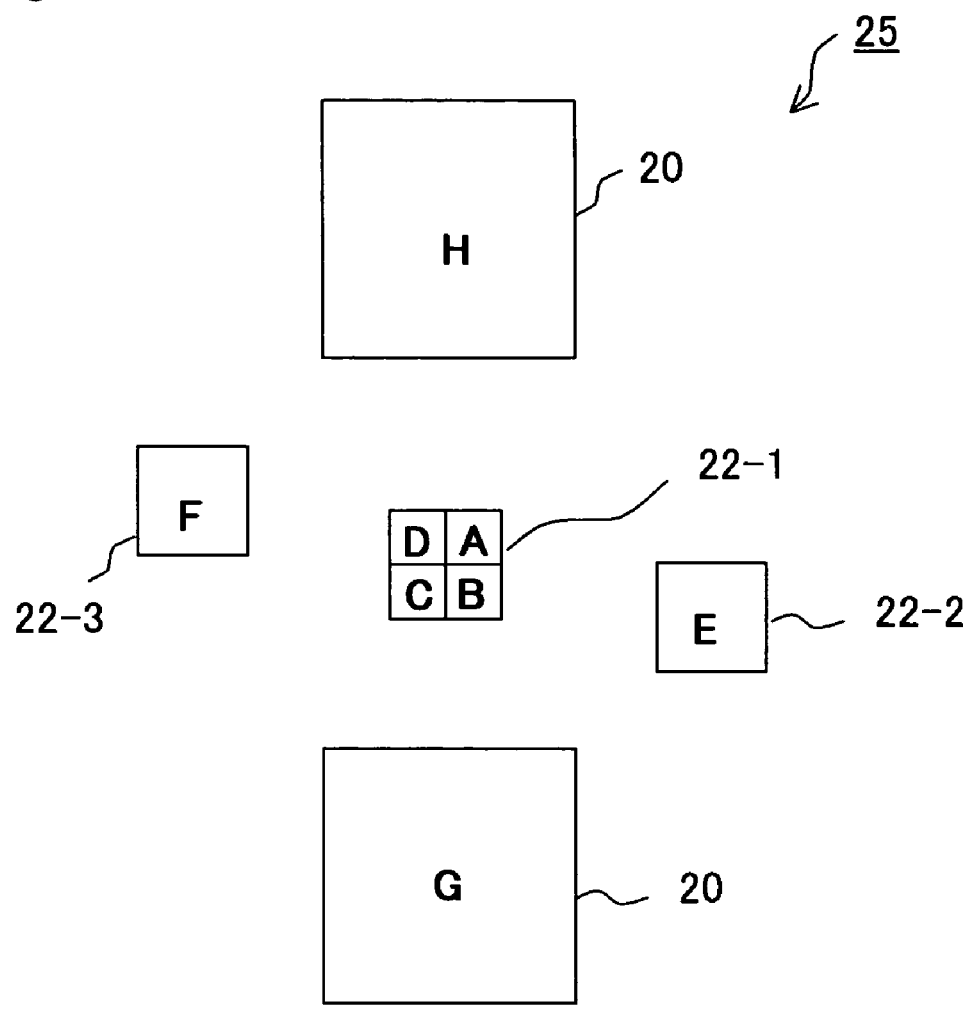
FIG. 9 is a diagram depicting the arrangement of the optical detector in FIG. 7 and FIG. 8.

The optical disk drive according to the present invention will now be described. FIG. 6 is a general block diagram depicting the optical disk drive according to an embodiment of the present invention, FIG. 7 is a diagram depicting the configuration of the optical system of the drive shown in FIG. 6, FIG. 8 is a block diagram depicting the signal processing system of the drive shown in FIG. 6, FIG. 9 is a diagram depicting the arrangement of the detectors in FIG. 7 and FIG. 8, FIG. 10 is a table showing the relationship of the output of the detector and generation signals, and FIG. 11 is a table showing each mode of the optical disk drive.

As FIG. 6 shows, the motor 18 rotates the optical information recording medium (MO disk) 4. Normally the MO disk 4 is a removable medium, and is mounted through the insertion slot of the drive, which is not illustrated. The optical pickup 4 is comprised of a magnetic head 35 and an optical head 7 which are arranged so as to sandwich the optical information recording medium 4.

The optical pickup 5 is moved by the track actuator 6, such as a ball screw feed mechanism, and can access an arbitrary position of the optical information recording medium 4 in the radius direction. The optical disk drive is further comprised of an LD driver 31 for driving the laser diode LD of the optical head 7 and a magnetic head driver 34 for driving the magnetic head 35 of the optical pickup 5. The servo controller for access 15-2 servo-controls the track actuator 6, motor 18 and focus actuator 19 of the optical head 7 by the output from the optical head 7. The controller 15-1 operates the LD driver 31, magnetic head driver 34 and servo controller for access 15-2 so as to record/regenerate information.

Details of the optical head 7 will be described with reference to FIG. 7. The diffused lights from the laser diode LD become parallel lights by the collimator lens 39 via the diffraction grating for three-beam tracking 10 and the beam splitter 11, which are reflected by the mirror 40, and are condensed up to near the diffraction limit on the optical information recording medium 4 by the objective lens 16.

A part of the lights that enter the beam splitter 11 are reflected by the beam splitter 11, and are condensed to the APC (Auto Power Control) detector 13 via the condensing lens 12.

The lights reflected by the optical information recording medium 4 are reflected by the mirror 40 via the objective lens 16 again, become converged light by the collimate lens 39, and enter the beam splitter 11 again. A part of the lights that enter the beam splitter 11 again return to the laser diode LD side, and the rest of the lights are reflected by the beam splitter 11, and are condensed onto the reflected light detector 25 via the three-beam Wollaston prism 26 and cylindrical lens 21.

The shape and arrangement of the reflected light detector 25 will be described. Since the reflected light detector 25 uses three beams of incident light, it is comprised of a four-division detector 22-1, MO signal detectors 20 arranged on the top and bottom thereof, and detectors for track error detection 22-2 and 22-3 arranged at the left and right thereof, as shown in FIG. 9.

The regeneration signal will be described with reference to FIG. 8 to FIG. 10. As FIG. 8 shows, the FES (Focus Error Signal) regeneration circuit 23 performs focus error detection (FES) by the astigmatism method shown in FIG. 10, using outputs A, B, C and D of the photoelectric converted four-division photo-detector 22. In other words $$FES=(A+C)-(B+D)/(A+B+C+D)$$

At the same time, track error detection (TES) is performed using the outputs E and F of the track detection detectors 22-2 and 22-3 in the TES generation circuit 24 by a computing equation of FIG. 10 based on the push-pull method.

$$TES=(E-F)/(E+F)$$

The focus error signal (FES) and the track error signal (TES) determined by these calculations are input to the main controller 15 (servo controller for access 15-2 in FIG. 6) as position error signals in the focus direction and track direction. In FIG. 8, the servo controller for access 15-2 and the controller 15-1 are integrated as shown in the main controller 15.

On the other hand, in the recording information detection system, the polarization characteristic of the reflected laser beam, which changes depending on the direction of the magnetization of the magneto-optical recording on the optical information recording medium 4, is converted into light intensity. In other words, in the three-beam Wollaston prism 26, a beam is separated into two beams of which the polarization directions are perpendicular to each other by the polarization detection, which enter the two-division photo-detector 20 via the cylindrical lens 21, and are photo-electric converted respectively.

The two electric signals G and H, after photo-electric conversion by the two-division photo-detector 20, are added by the addition amplifier 29 according to the computing equation in FIG. 10, become the first ROM signal (ROM 1=G+H), and are subtracted by the subtraction amplifier 30 at the same time, become the RAM read (MO) signal (RAM=G–H), and are input to the main controller 15 respectively.

In FIG. 8, the reflected light of the semiconductor laser diode LD, which entered the photo-detector for APC 13, is photo-electric converted, and is input to the main controller 15 via the amplifier 14 as the second ROM signal (ROM 2).

Also as described above, the first ROM signal (ROM 1) which is output from the addition amplifier 29, the RAM signal (RAM) which is the output of the differential amplifier 30, the focus error signal (FES) from the FES generation circuit 23, and the track error signal (TES) from the TES generation circuit 24 are input to the main controller 15.

Also the data for recording and the read data are input/output between the main controller 15 and the data source 32 via the interface circuit 33.

The first ROM signal (ROM 1=G+H), the second ROM signal (ROM 2=I) and the RAM signal (RAM=G–H), that are input to the main controller 15, are detected and used in the respective mode, that is when ROM and RAM are simultaneously regenerated, when only ROM is regenerated, and when magnetic modulation and optical modulation RAM recording (WRITE) is executed.

FIG. 11 is a table showing the combination of ROM 1 (=G+H), ROM 2 (=I) and RAM (G–H) detection in each mode. The main controller 15 generates a command signal to the LD driver 31 according to each mode. According to the command signal, the LD driver 31 controls the emission power of the semiconductor laser diode LD with negative feedback for the first ROM signal (ROM 1=G+H) when ROM and RAM are regenerated, and controls the emission power of the semiconductor laser diode LD with negative feedback for the second ROM signal (ROM 2=I) when RAM is recorded.

In the case of magneto-optical (RAM) recording, data from the data source 32 is input to the main controller 15 via the interface 33 (see FIG. 8). The main controller 15 supplies this input data to the magnetic head driver 34 when the magnetic field modulation recording method is used. The magnetic head driver 34 drives the magnetic head 35 and modulates the magnetic field according to the recorded data. At this time, in the main controller 15, the signal to indicate recording is sent to the LD driver 31 and the LD driver 31 controls the emission of the semiconductor laser diode LD with negative feedback according to the second ROM signal (ROM 2=I), so as to become the optimum laser power for recording.

When the optical modulation recording method is used, this input data is sent to the LD driver 31 and drives the laser diode LD for optical modulation. At this time, in the main controller 15, the signal to indicate recording is sent to the LD driver 31, and the LD driver 31 controls the emission of the semiconductor laser diode LD with negative feedback according to the second ROM signal (ROM 2=I), so as to become the optimum laser power for recording.

In the above example used for description, the focusing error signal is detected by the astigmatism method, and the tracking error signal is detected by the three-beam method, and the MO signal is detected from the differential detection signal of the polarization component, but the above optical system is used for an embodiment of the present invention, where the knife edge method or spot size detection method, for example, may be used without problems as the focusing error detection method. For the tracking error detection method, the push-pull method or phase difference method may be used without problems.

The main controller 15 (servo controller 15-2 in FIG. 6) drives the focus actuator 19 according to the detected focus error signal FES, and controls the focusing of the light beam. The main controller 15 (servo controller 15-2 in FIG. 6) drives the track actuator 6 according to the detected track error signal TES, and performs seek and track follow up control of the light beam.

Here the signal of (G+H) of the detector 25 or the signal of I of the detector 13 is used for laser power adjustment. As FIG. 11 shows, when the ROM signal and RAM signal are simultaneously regenerated, the laser power is controlled for the signal of (G+H) to be constant, so that the RAM read signal (=G–H) does not receive cross-talk from the phase bit modulation of the optical information recording medium 4. ROM is not detected during optical modulation recording.

Read/Write Mechanism

In addition to the above mentioned basic ROM-RAM simultaneous read mechanism, the RAM recording mechanism linked with the ROM/RAM regeneration is disposed in the present invention.

Figure 12:
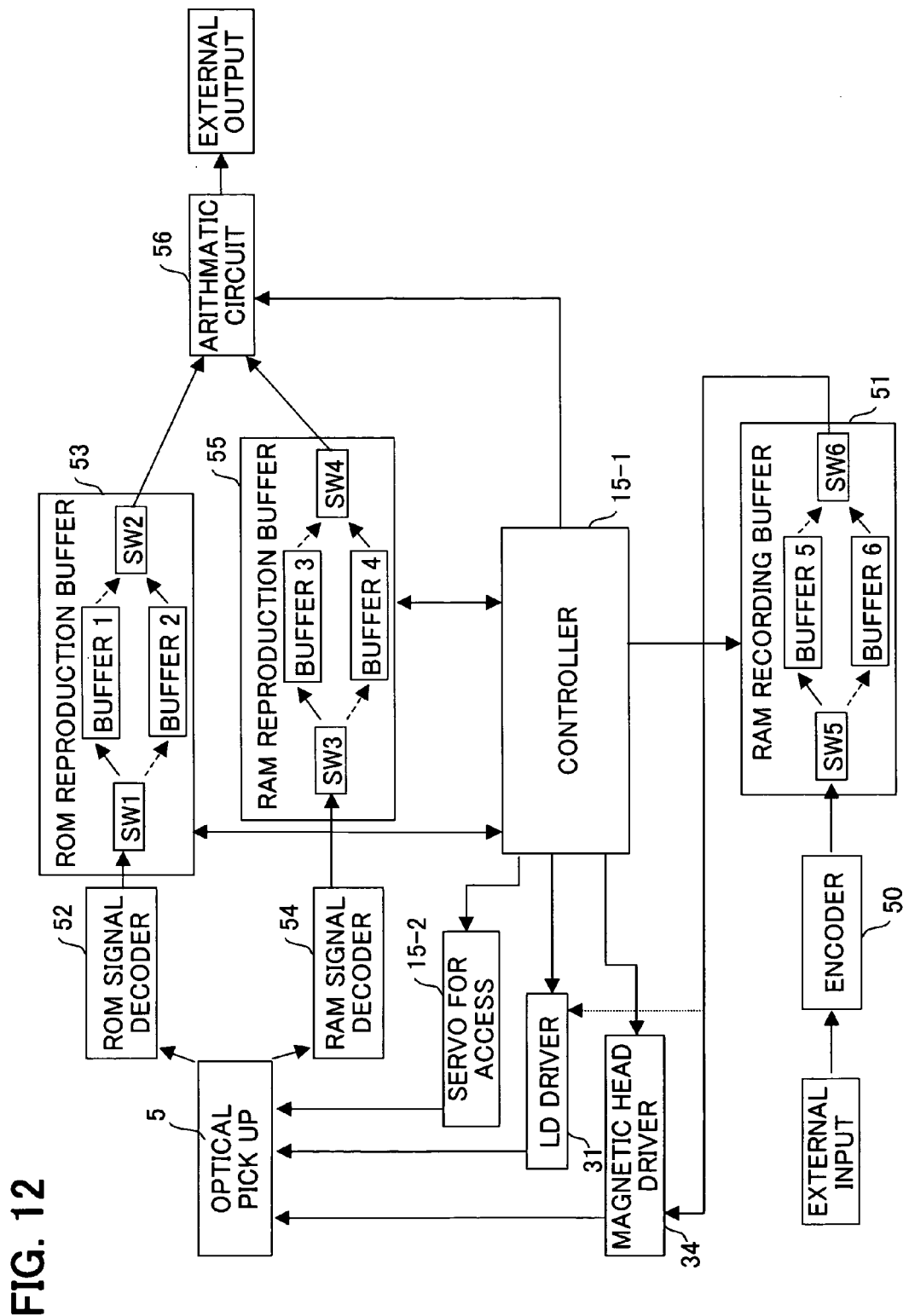
FIG. 12 is a block diagram depicting the read/write system in FIG. 6.
Figure 14:
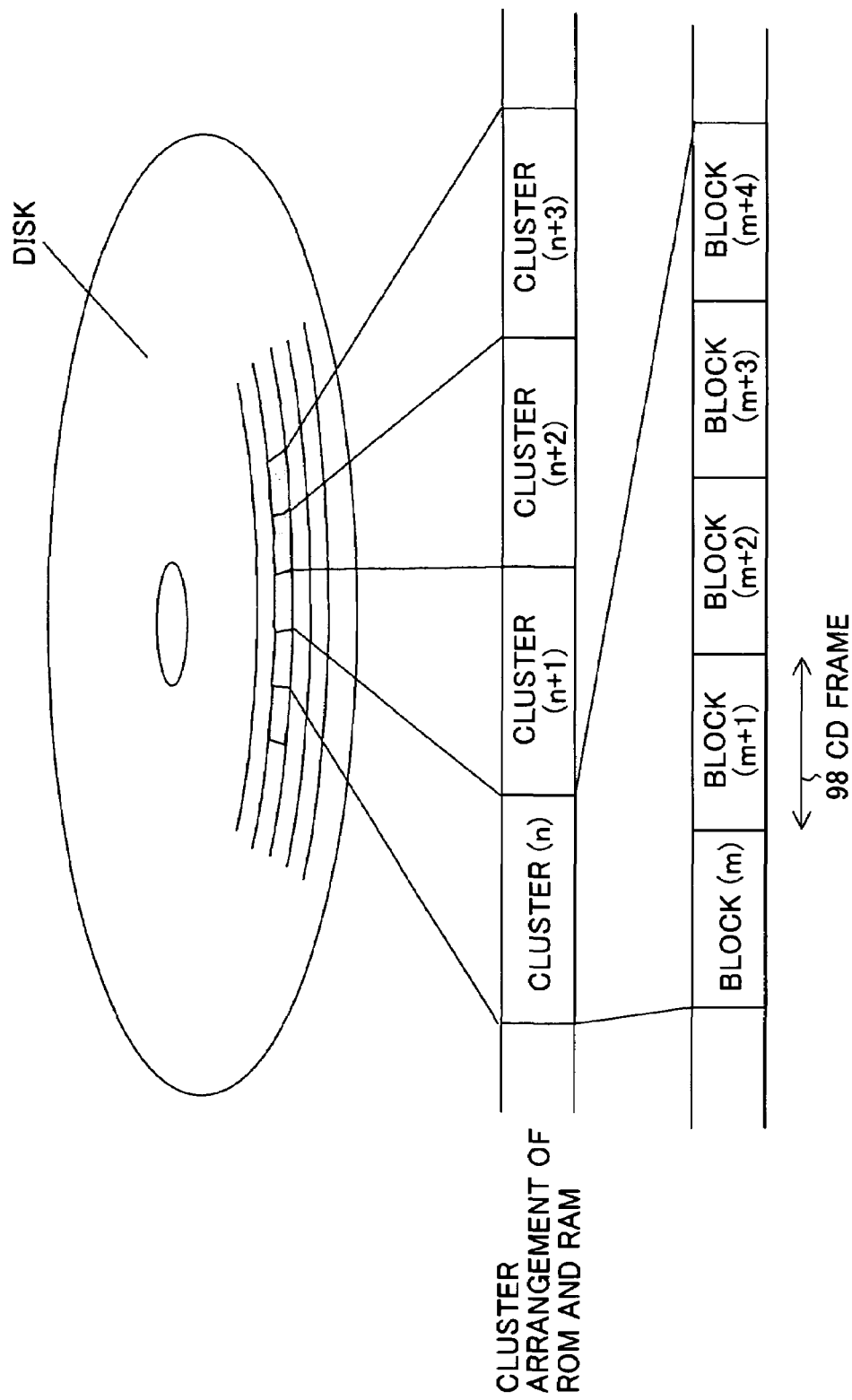
FIG. 14 is a diagram depicting the arrangement of clusters of the disk in FIG. 12.
Figure 15:
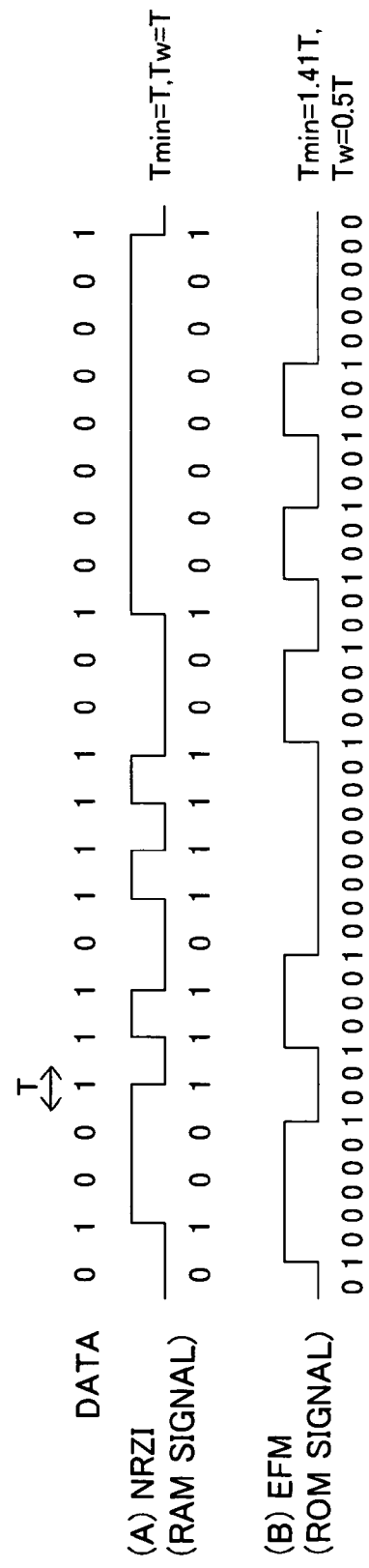
FIG. 15 is a diagram depicting the modulation system of the RAM and ROM signals in FIG. 12.
Figure 16:
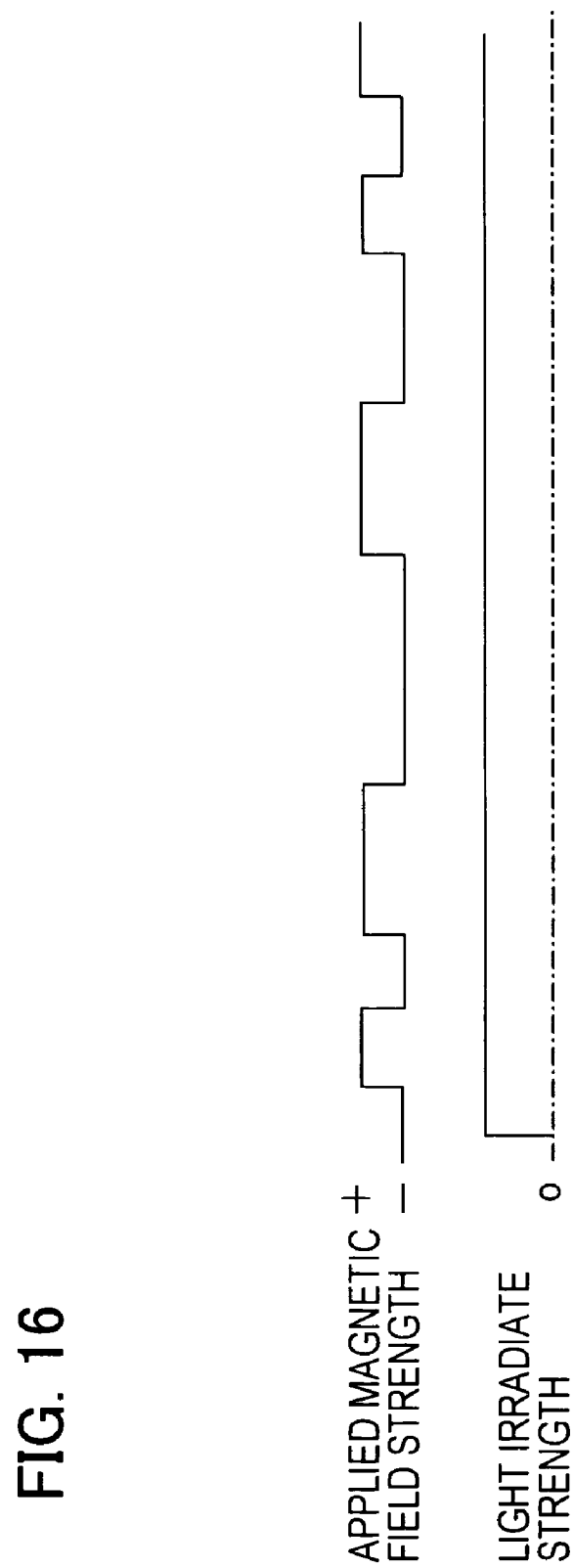
FIG. 16 is a diagram depicting the magnetic field modulation recording system in the recording in FIG. 12.

FIG. 12 is a block diagram depicting the read/write mechanism of the present invention, FIG. 13 is a diagram depicting the recording/regeneration processing thereof, FIG. 14 is a diagram depicting the arrangement of the clusters of ROM and RAM on a disk, FIG. 15 is a diagram depicting the RAM signal and ROM signal, and FIG. 16 is a diagram depicting the magnetic field modulation recording system.

In FIG. 12, composing elements the same as those shown in FIG. 6 and FIG. 8 are denoted with the same reference numbers. In other words, in addition to the configuration shown in FIG. 6, that is the optical pickup 5, LD driver 31, magnetic head driver 34, servo controller for access 15-2 and main controller 15-1, the disk drive further comprises an encoder 50, decoders 52 and 54, computing unit 56 and buffer memories 51, 53 and 55.

The encoder 50 encodes the externally input data to the NRZI (Non Return to Zero Inverted) signal which is suitable for the later mentioned magneto-optical (RAM) recoding. The RAM recording buffer 51 is a velocity conversion buffer for input data, which converts the transfer velocity V of the input data into n times of the velocity.

The ROM signal decoder 52 decodes the ROM signal (EEM signal) read by the optical pickup 5 into the output signal. The ROM regeneration buffer 53 is a velocity conversion buffer for output data, which converts the transfer velocity nV of the output data into 1/n of the velocity.

The RAM signal decoder 55 decodes the NRZI signal which was read by the optical pickup 5 and is suitable for the later mentioned magneto-optical (RAM) recording. The RAM regeneration buffer 55 is a velocity conversion buffer for output data, and converts the transfer velocity nV of the output data into 1/n of the velocity. The computing unit 56 is comprised of a mixing circuit, for example, computes the ROM signal and RAM signal which were read, and outputs the result to the outside.

Each buffer memory 51, 53 and 55 is sub-divided into two buffer memories 5 and 6, 1 and 2 and 3 and 4, and has switch circuits SW1, SW2, SW3, SW4, SW5 and SW6 so that when one memory reaches the reference volume, it is switched to the other memory. It is possible to make the content of the buffer memory to be first-in-first-out, even if the internal structure of the buffer memory is not sub-divided, but the configuration becomes complicated.

The volume of the memory to be recorded in the buffer can be freely set, but in the present embodiment, both the ROM section and RAM section have a CDROM format, as shown in FIG. 14, so that the block address positions of the ROM and RAM are the same for convenience. The basic unit for actual recording/regeneration can be a block unit, and in the present embodiment, it is defined that five blocks are one cluster, which is the basic unit of recording/regeneration, where one block is 98 CD frames.

If the size of one cluster is too large, an enormous buffer memory is required, and if too small, the volume that can be read or written during one rotation of the optical information recording medium 4, which makes the ratio of the access time relatively large. Therefore in the present embodiment, five blocks are one cluster, considering a balance with the access time.

FIG. 13 shows the ROM-RAM recording/regeneration processing executed by the main controller 15-1 when n=4, that is 4 times of velocity. This table shows the external output cluster position, external input cluster position, cluster position of optical pickup 5, status of the optical pickup 5 (read, access, write), and stored data volume of ROM regeneration buffer 53, and RAM regeneration buffer 55 and RAM recording buffer 51. Each buffer memory has an internal structure where the buffer memory is divided into two, where when the data stored in one buffer memory reaches the volume for one cluster, the rest of the data is stored in the other buffer memory.

The controller 15-1 rotates the motor 18, for rotating the optical information recording medium 4, at velocity n (four in this case) times of the reference information regeneration velocity V, reads the ROM signal and RAM signal of the optical information recording medium 4 at n times of the regeneration velocity V, and stores the data in the buffer memory for reading ROM signal 53 and buffer memory for reading RAM signal 55. And the controller 15-1 reads the information stored in the buffer memories 53 and 55 at the velocity of regeneration velocity V, outputs it to the computing unit 56, and outputs the result to the outside via the output interface.

The controller 15-1 stores the information which was input from the input interface at velocity V in the buffer memory for writing RAM signals 51. And before the information of the ROM signals to be output from the buffer memories 53 and 55 runs out (before regeneration ends), the optical pickup 5 accesses the RAM address position, which is managed such that the time relationship between the output information and input information roughly match, and information from the buffer memory for writing RAM signals 51 is recorded in the optical information recording medium 4 as RAM signals at velocity n times of the regeneration velocity V.

The internal structure of the buffer memory for reading ROM signals 53, the buffer memory for reading RAM signals 55 and the buffer memory for writing RAM signals 51, is comprised of two internal buffer memories and a switch, so that when one internal buffer memory reaches the reference volume, the rest of the data is stored in the other internal buffer memory. This makes RAM recording possible without interruption while regenerating ROM and RAM data.

The information from the buffer memory for reading ROM signals 53 and the information from the buffer memory for reading RAM signals 55 can be mixed and output using the computing unit 56 for computing the information.

By this, recording and regeneration can be performed without interruption while outputting and inputting information linked at the original velocity. Basically, this can be implemented if n>2, but the time that can be used for accessing by the optical pickup must be a time when the velocity is a multiple of a decimal, so the recording and regeneration velocity is preferably 4 times of velocity or more.

In FIG. 13, the optical pickup 5 reads the clusters of ROM and RAM at the position 'n', stores them in the buffers 1 and 3, and after reading, outputs the regeneration signals according to the cluster position 'n' to the outside. During this output, the cluster position 'n+1', following the cluster position n, is read at 4 times of velocity, and the information is stored in the buffers 2 and 4. According to the output of the regeneration signal of this buffer 1, the input data is input to the buffer 5. When the output of the regeneration signal of the buffer 1 ends, the input data, according to the regeneration signal of the buffer 1, is recorded in the cluster position 'n' of the RAM.

At this time, reading at the cluster positions 'n' and 'n+1' has been completed, so the position of the optical pickup 5 is 'n+1'. Therefore before output of the regeneration signals of the buffer 1 ends, the optical pickup 5 accesses the position 'n' by rotation waiting or by track jump, and the input cluster is written. During this writing, the regeneration signals of the buffer 2 are being output, so the regeneration signals are not interrupted.

After writing at the cluster position 'n' ends, the optical pickup 5 is positioned at the position 'n+2' by rotation waiting, for example, the optical pickup 5 reads the clusters of ROM and RAM at the position n+2, and stores them in the buffers 1 and 3. Hereafter the read, regeneration and write sequence is executed in the same way.

In this way, the read/read/access/write/access sequence is performed and overwrite to RAM is performed, and the overwrite to RAM can be implemented at 4 times of velocity while simultaneously regenerating ROM-RAM. For example, in car navigation equipment, map information is recorded in ROM and the corresponding road information is recorded in RAM, and while simultaneously regenerating these, new road information can be overwritten at a corresponding position.

Now the case of recording based on the magnetic field modulation recording method in which an applied magnetic field intensity is modulated without modulating the light irradiation intensity, as shown in FIG. 16, will be considered. As the example in FIG. 15 shows, it is assumed that the modulation method used for recording the ROM signal is EFM (Eight to Fourteen Modulation), and the modulation method of RAM data to be magneto-optical-recorded is NRZI (Non Return-to-Zero Inverted Recording)

If the minimum mark is Tmin and the window margin width is Tw with respect to the bit length T of the original data, as shown in FIG. 15, then Tmin=T and Tw=T in the case of NRZI (FIG. 11A), and Tmin=1.41T and Tw=0.47T in the case of EFM (FIG. 1B)

For the RAM signals, where the frequency characteristics of the magnetic field modulation write signals are limited, a configuration with a large window margin width Tw and a long minimum mark Tmin is suitable. For ROM signals, on the other hand, the EFM method, of which the minimum mark Tmin is long, is suitable. Therefore in the present invention, it is preferable to use different recording modulation methods which are suitable for the RAM signal and ROM signal respectively.

In the above mentioned magnetic field modulation method, information is recorded by inverting the magnetic field with the irradiation power of the semiconductor laser diode LD constant. The semiconductor laser diode LD may be emitted by pulses so as to change the applied magnetic field according to the signal. Compared with the case of recording by constantly emitting the semiconductor laser diode LD, this relaxes the arrow feather shape of the recording mark. By relaxing the arrow feather shape of the recording mark, the characteristics of the regeneration signal can be improved.

Other Embodiments

Figure 17:
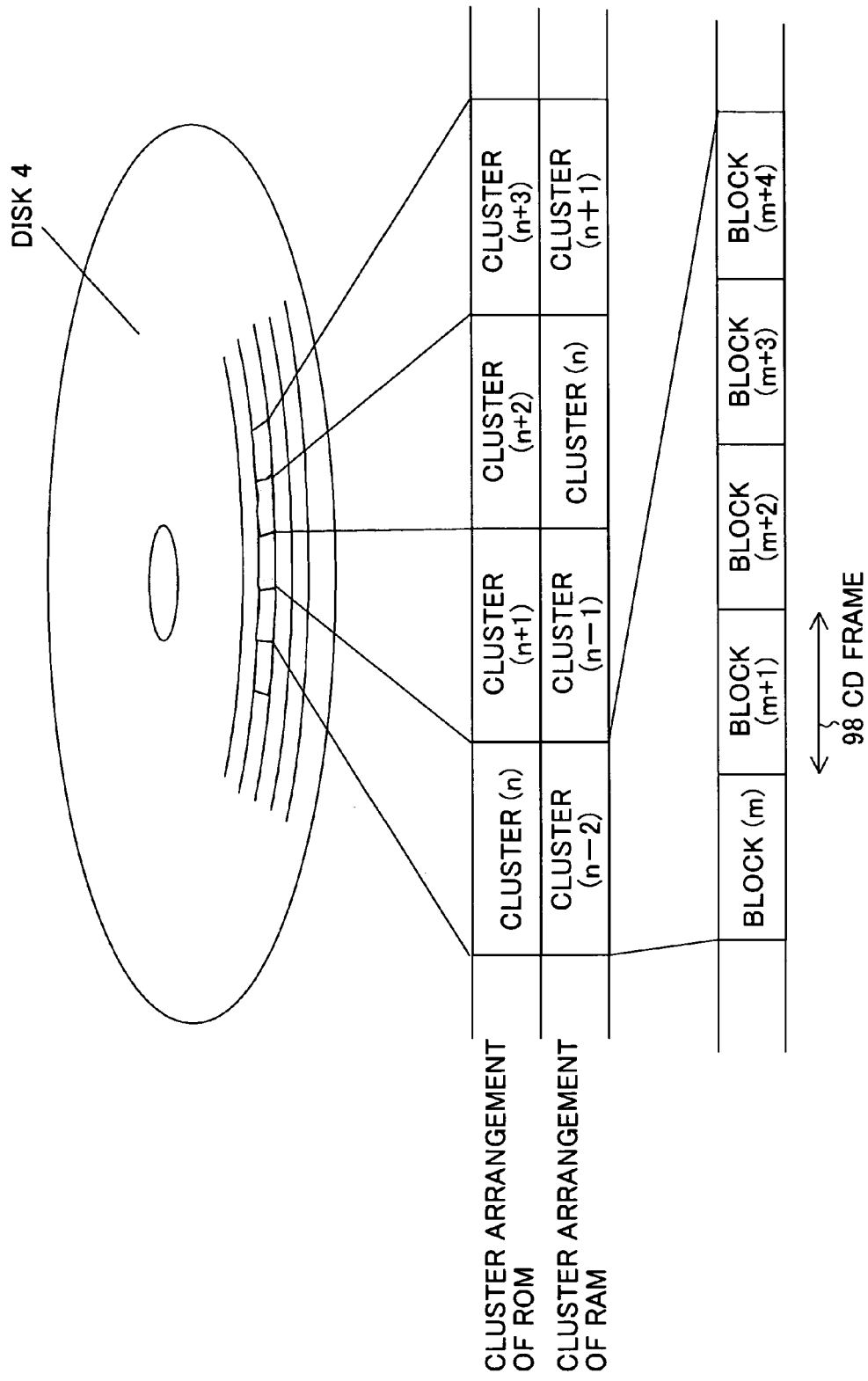
FIG. 17 is a diagram depicting another arrangement of clusters of the disk in FIG. 12.

FIG. 17 is a diagram depicting another arrangement of clusters of the optical information recording medium according to the present invention. In the example of FIG. 14, both the ROM section and RAM section have a CDROM format, and the block address positions of ROM and RAM are the same for convenience. In the example of FIG. 17, the physical arrangement of clusters is shifted between ROM and RAM. With this arrangement as well, regeneration and recording matching the cluster address positions, as in the processing in FIG. 13, can be implemented. In the manufacturing level of the medium, it is preferable that the cluster positions between ROM and RAM physically and logically match in terms of file management. But physically close positions may be acceptable. However for file management, the logical positional relationship must be matched.

Figure 18:
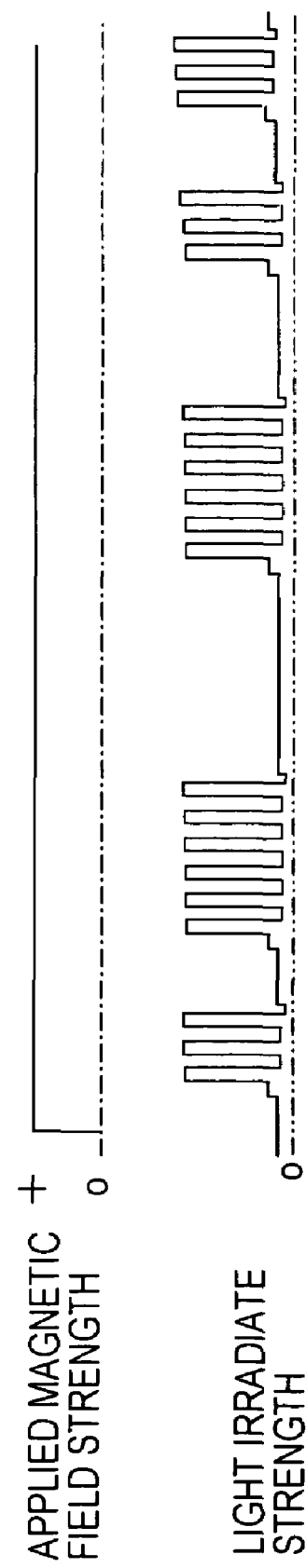
FIG. 18 is a diagram depicting the optical modulation overwrite recording system in another recording in FIG. 12.

FIG. 18 is a diagram depicting an applied magnetic field and a light irradiation intensity when recording is performed using the medium for optical modulation overwrite, shown in FIG. 2. In the present invention, signals are output and input simultaneously, but since the timing of optical reading and writing of the optical storage medium are shifted, as shown in FIG. 13, RAM signals may be recorded with modulating the light irradiation intensity while a predetermined magnetic field is applied, as shown in FIG. 18. The magnetic field does not cause AC modulation, and the magnetic field applied unit can be arranged with taking sufficient space with the optical information recording medium.

Figure 19:
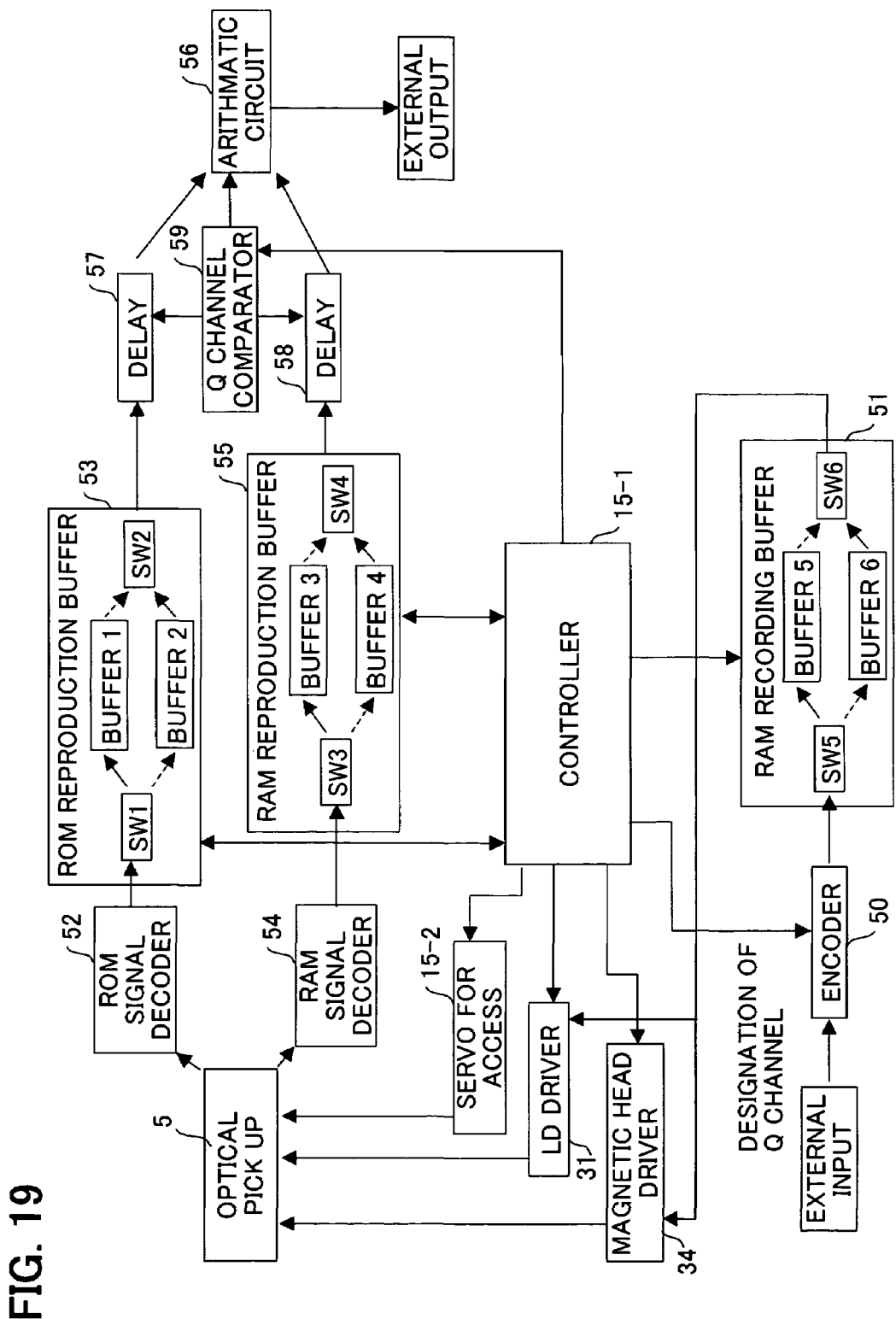
FIG. 19 is a block diagram depicting another embodiment of the read/write system of the present invention.
Figure 20:
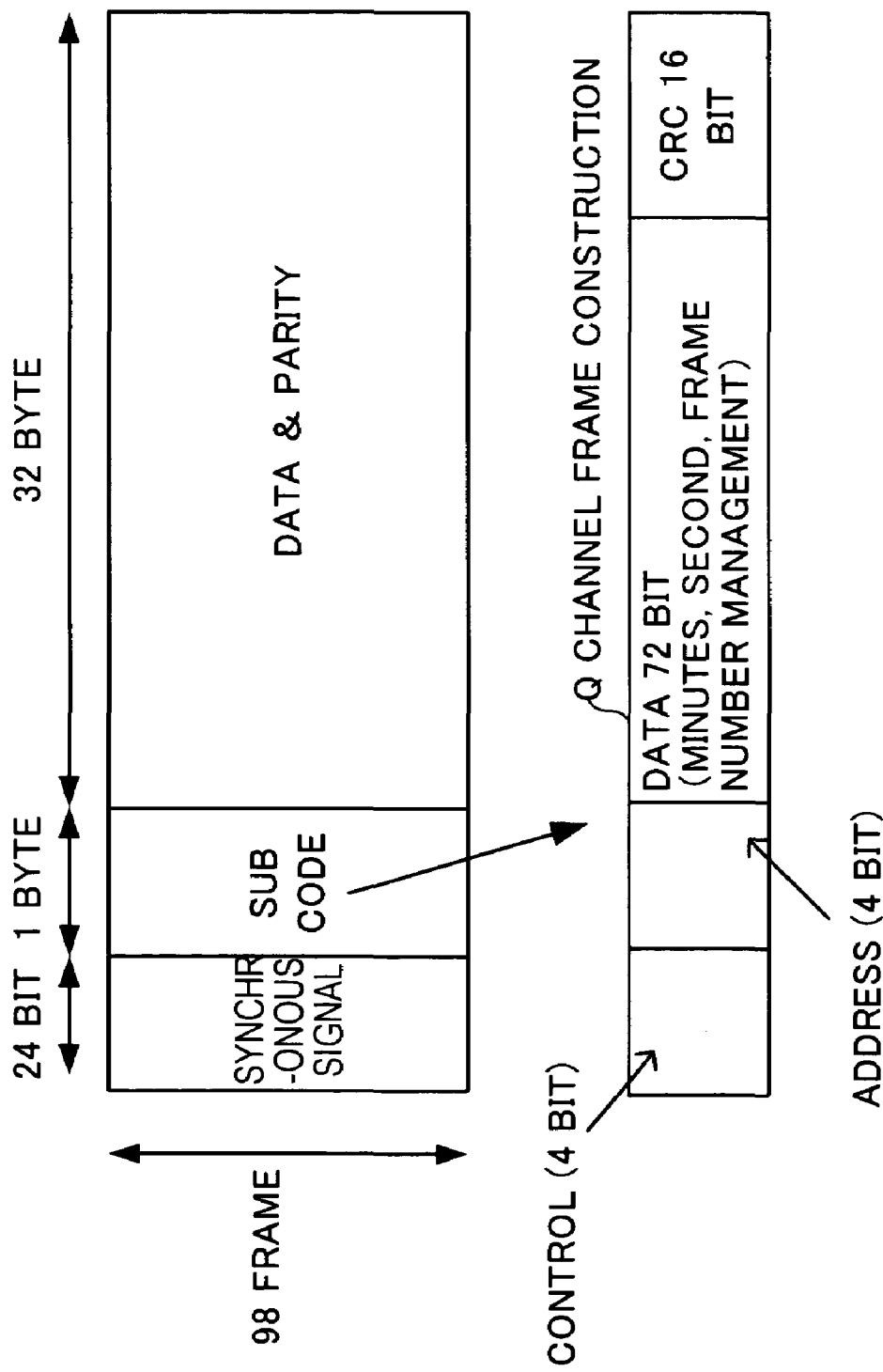
FIG. 20 is a diagram depicting the data configuration of the Q channel for CD for describing the operation in FIG. 19.
Figure 21:
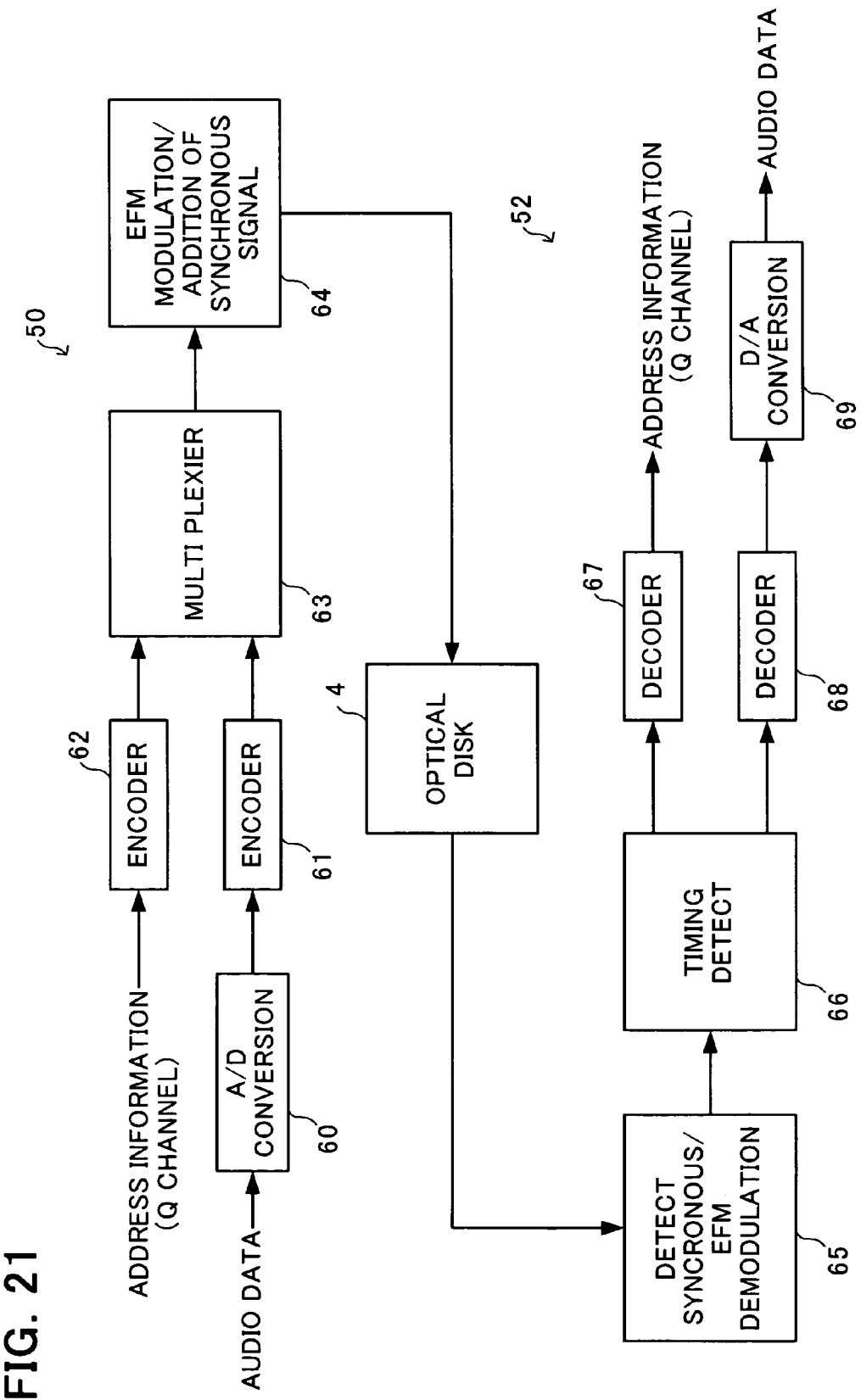
FIG. 21 is a diagram depicting the read/write flow of the Q channel data in FIG. 19.

FIG. 19 is a block diagram depicting another read/write mechanism of the optical storage apparatus of the present invention, FIG. 20 is a diagram depicting the Q channel used for this read/write mechanism, and FIG. 21 is a diagram depicting the flow of voice and address data in FIG. 19.

In FIG. 19, component elements the same as FIG. 12 are denoted with the same symbols. In addition to the optical pickup 5, LD driver 31, magnetic head driver 34, servo controller for access 15-2, main controller 15-1, encoder 50, decoders 52 and 54, computing unit 56 and buffer memories 51, 53 and 55 shown in FIG. 12, a Q channel function, having the time information used for CD audio, is disposed.

Specifically, the encoder 50 is one which supports the Q channel. At the output side, the delay circuits 57 and 58 and the Q channel comparator 59 are disposed. In other words, a Q channel used for music CDs is used as a method of the address link between ROM and RAM.

As FIG. 20 shows, in a music CD, 98 frames of address information are controlled based on the minute, second and frame number by the Q channel data (sub-code) installed in the 98 frames of the data area for the 98 frames (five blocks).

As FIG. 19 shows, Q channel code is added to the input data by the encoder 50 when the input data is recorded from the controller 15 to RAM. Considering details, the voice data is encoded by the encoder 61 after analog/digital converted by the A/D converter 60, as shown in FIG. 21. In addition to this, the address information (Q channel) acquired from a clock, such as a timer, is encoded by the encoder 62. Both information are combined by the multiplexer 63, and is EFM-modulated (synchronization signal is added).

When data is recorded from the controller to RAM, the optical pickup 5 accesses the frame position specified by the Q channel code, and records the data in the optical disk 4.

At regeneration, the controller 15-1 adjusts the delay circuits 57 and 58 so as to link with the ROM and RAM addresses. In other words, in the decoders 52 and 54, the ROM and RAM signals from the optical disk 4 are demodulated by the synchronization detection/EFM demodulation circuit 65, and are separated into voice and addresses (Q channel) by the timing detection circuit 66. The separated voice and addresses are decoded by each decoder 67 and 68, and are output as address information (Q channel). The decoded voice signal is converted into an analog voice signal by the D/A converter 69, and is input to the buffer 53 or 55.

The controller 15-1 sends this Q channel data to the Q channel comparator 59, adjusts the delay time of the ROM signal and RAM signal using each delay circuit 57 and 58, and outputs it to the computing unit 56.

Because of this, the output side can adjust the time relationship between the ROM signal and RAM signal so as to match even if the stored positions of the ROM signal and RAM signal are shifted. In this way, an overwrite to RAM can be implemented while simultaneously regenerating ROM-RAM.

As described above, the optical information recording medium, where a multi-layer film including the magneto-optical recording film is formed on the transparent substrate having the phase pits, has two characteristics: (1) simultaneous regeneration of ROM and RAM is possible with one optical pickup, and (2) data can be recorded to RAM while regenerating ROM.

According to the present invention, simultaneous regeneration at n times of velocity and intermittent recording using the buffer memory are added, so recording a singing voice at a linked position while listening to karaoke, and regenerating it together with the karaoke music, for example, is possible.

Also in a system where new information is added while outputting stream information, such as music and moving pictures, or in a navigation system, information can be recorded and regenerated without interrupting the stream information.

Also in the simple combination of ROM regeneration and RAM recording, a very fast access speed and transfer speed are demanded, because in the case of map information, for example, a file, where addresses and other information on the added/updated information is recorded, is read in advance, and then the RAM information position corresponding to the ROM information is accessed to regenerate and record the information.

According to the present invention, ROM and RAM addresses can be corresponded roughly as 1:1, so reading a file to indicate the link of ROM and RAM information is unnecessary, which is suitable for recording and regenerating stream information.

The read buffer and write buffer were described separately, but areas in one buffer may be divided for reading and for writing. The computing unit need not be an independent circuit, but may be a program executed by the controller.

INDUSTRIAL APPLICABILITY

Since simultaneous regeneration at n times of velocity and intermittent recording using the buffer memory are added to the optical storage medium which can implement the simultaneous regeneration of ROM-RAM, information which is being input at a reference velocity can be linked and recorded without interruption while outputting information at the reference velocity using one optical information recording medium.

Also signals, when a ROM signal and RAM signal linked with the ROM signal are computed, can be output using one optical information recording medium.

Since input and output are synchronized, the present invention can be implemented with a relatively small capacity buffer, without installing a large capacity buffer, and can be implemented without increasing the apparatus cost very much.

The invention claimed is:

1. An optical storage apparatus comprising:
    an optical head for irradiating light onto an optical information recording medium in which a magneto-optical recording film is formed on a substrate on which phase pits are formed, detecting the light intensity of light modulated by said phase pits from return light from said optical information recording medium as ROM signals, and detecting the differential amplitude of components in a polarization direction when said return light is modulated by said magneto-optical recording film as RAM signals;
    a magnetic field application unit for applying a magnetic field to the information recording medium for recording the information to said magneto-optical recording film;
    a track actuator for accessing at least said optical head at a desired position of said optical information recording medium;
    a buffer memory for reading to store at least said detected ROM signals;
    a buffer memory for writing to store input signals to be written to said magneto-optical recording film; and
    a controller for reading at least said ROM signals at n (n>2) times of information regeneration velocity V, which is a reference, storing said ROM signals in said buffer memory for reading, then outputting said stored information at the velocity of said information regeneration velocity V,
    wherein said controller stores said input information to said buffer memory for writing, then accessing said optical head at an address position that is managed so that the time relationship of said output information and said input information link and records the information from said buffer memory for writing at said n times of velocity as RAM signals, while said stored information is being output from said buffer memory for reading.

2. The optical storage apparatus according to claim 1, wherein said buffer memory for reading further comprises:
    a buffer memory for reading ROM signals that stores said ROM signals; and
    a buffer memory for reading RAM signals that stores said RAM signals,
    wherein further comprises a computing unit for computing information from both of said buffer memories for reading.

3. The optical storage apparatus according to claim 1, wherein at least one of said buffer memory for reading ROM signals and buffer memory for writing RAM signals further comprises two internal buffer memories and a switch,
    and wherein said controller switches said switch when the storage volume in one internal buffer memory reaches a reference volume, and stores the information to the other internal buffer memory.

4. The optical storage apparatus according to claim 1, wherein said magnetic field application unit further comprises a magnetic head that moves along with said optical head, and applies a modulated magnetic field at a position in which said optical head condenses light, so as to execute overwrite recording.

5. The optical storage apparatus according to claim 1, wherein said information is read and said information is recorded at $n \geq 4$.

6. The optical storage apparatus according to claim 1, wherein said controller modulates the irradiation power of said optical head to execute overwrite recording.

7. The optical storage apparatus according to claim 1, wherein said controller controls the read and write of said magneto-optical recording film using a RAM format of said magneto-optical recording film that is the same as a ROM format by said phase pits of said optical information recording medium.

8. A read and write method for an optical storage medium, comprising:
 a step of irradiating light onto an optical information recording medium in which a magneto-optical recording film is formed on a substrate on which phase pits are formed, detecting the light intensity of light modulated by said phase pits from return light from said optical information recording medium as ROM signals, and detecting the differential amplitude of components in a polarization direction when said return light is modulated by said magneto-optical recording film as RAM signals;
 a step of reading at least said ROM signals at n (n>2) times of information regeneration velocity V, which is a reference, storing said ROM signals in a buffer memory for reading, and then outputting said stored information at the velocity of said information regeneration velocity V; and
 a step of accessing an optical head at an address position that is managed so that the time relationship of said output information and said input information link, after said input information is stored in the buffer memory for writing, and recording the information from said buffer memory for writing at said n times of velocity as RAM signals, while said stored information is being output from said buffer memory for reading.

9. The read and write method for an optical storage medium according to claim 8, wherein said reading step further comprises:
 a step of storing the ROM signals of said optical information recording medium to a buffer memory for reading ROM signals; and
 a step of storing said RAM signals of the optical information recording medium to a buffer memory for reading RAM signals;
 and wherein said output step further comprises a step of computing information from both said buffer memories for reading.

10. The read and write method for an optical storage medium according to claim 8, wherein said storage step further comprises a step of switching a switch and storing the information to the other internal buffer memory, when, in at least one of buffer memory for reading ROM signals and buffer memory for writing RAM signals comprised of two internal buffer memories and a switch respectively, a storage volume of one internal buffer memory reaches a reference volume.

11. The read and write method for an optical storage medium according to claim 8, wherein said recording step further comprises a step in which a magnetic head that moves along with said optical head applies a modulated magnetic field at a position in which said optical head condenses light, so as to execute overwrite recording.

12. The read and write method for an optical storage medium according to claim 8, wherein said information is read and said information is recorded at $n \geq 4$.

13. The read and write method for an optical storage medium according to claim 8, wherein said recording step further comprises a step of modulating the irradiation power of said optical head to execute overwrite recording.

14. The read and write method for an optical storage medium according to claim 8, wherein the read and write of said magneto-optical recording film are controlled using a RAM format of said magneto-optical recording film that is the same as a ROM format by said phase pits of said optical information recording medium.

* * * * *